United States Patent
Whitlock et al.

(10) Patent No.: US 8,107,886 B2
(45) Date of Patent: Jan. 31, 2012

(54) METHOD AND APPARATUS FOR USER QUALITY MANAGEMENT FOR WIRELESS NETWORKS

(75) Inventors: Chris Whitlock, London (GB); Dionysis Stavrogiannopoulos, Athens (GR)

(73) Assignee: International Business Machines Corporation, Austin, TX (US)

( * ) Notice: Subject to any disclaimer, the term of this patent is extended or adjusted under 35 U.S.C. 154(b) by 515 days.

(21) Appl. No.: 11/782,788

(22) Filed: Jul. 25, 2007

(65) Prior Publication Data
US 2008/0081585 A1 Apr. 3, 2008

Related U.S. Application Data

(60) Provisional application No. 60/833,414, filed on Jul. 25, 2006.

(51) Int. Cl.
*H04B 17/00* (2006.01)
*H04W 24/00* (2009.01)

(52) U.S. Cl. .......... 455/67.11; 455/423; 455/226.1; 709/224

(58) Field of Classification Search .......... 709/223, 709/225; 455/423, 425
See application file for complete search history.

(56) References Cited

U.S. PATENT DOCUMENTS

| | | | | |
|---|---|---|---|---|
| 7,299,277 B1* | 11/2007 | Moran et al. | ......... | 709/224 |
| 2005/0097209 A1* | 5/2005 | McDonagh et al. | ......... | 709/224 |
| 2006/0039354 A1* | 2/2006 | Rao et al. | ......... | 370/352 |
| 2007/0117516 A1* | 5/2007 | Saidi et al. | ......... | 455/67.11 |

OTHER PUBLICATIONS

"Non-Intrusive Perceptual Quality Measurement for Quality Assurance in NGN and 3G Networks", The IEE, Michael Faraday House, Six Hills Way, Stevenage, SG1 2AY, UK, 2003.*

* cited by examiner

*Primary Examiner* — Temesgh Ghebretinsae
*Assistant Examiner* — Gennadiy Tsvey
(74) *Attorney, Agent, or Firm* — Seth H. Ostrow; Ostrow Kaufman LLP (57) ABSTRACT

The present invention provides for monitoring quality of service on a receiver unit in a wireless communication system by configuring one or more monitors on the receiver unit according to a configuration file and using the monitors to collect event data relating to the activities of the receiver unit using the monitors. The method further includes filtering the event data according to the configuration file, transmitting the filtered event data to the control function unit and packaging the filtered event data to be transmitted to a collector unit. The method further includes transmitting the filtered event data to the collector unit during the active communication session, processing and transmitting the filtered event data to a target unit and generating a result summary of the filtered event data. In another embodiment, the present invention provides an apparatus for monitoring quality of service on a receiver unit in a wireless communication system.

16 Claims, 5 Drawing Sheets

METHOD AND APPARATUS FOR USER QUALITY MANAGEMENT FOR WIRELESS NETWORKS

CLAIM OF PRIORITY

The present application relates to and claims priority to Provisional Application Ser. No. 60/833,414 filed on Jul. 25, 2006, which is hereby incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

The present invention relates generally to monitoring, maintaining and optimizing end-to-end user quality delivered to a mobile customer in a wireless communication system. More specifically, the invention relates to internal monitoring system level quality and processing of a mobile device.

A conceptual network "user-plane" carries user traffic such as voice, video, streaming data, SMS, MMS, over the many diverse nodes in the wireless network. The quality of the service supplied over the user-plane directly impacts the business case of the wireless carrier. Superior communication quality extends average call times and revenue, while poor communication quality decreases user satisfaction. Service adoption, usage and penetration can also be hindered by functionality that doesn't work adequately. Therefore, users become quickly frustrated with non-performing features.

In addition, current mechanisms for maintaining service quality are expensive and unrepresentative of the consumer's spatial and temporal experience. Drive testing is labor intensive, simulated, and limited to pre-determined geographical routes. Network Edge-testers are expensive to deploy and maintain, offering only intrusive testing on fixed geographical locations.

Wireless carries also look to differentiate their service to critical customers by offering Service Level Agreements (SLAs). SLAs contractually guarantee a certain minimum service delivery quality to the consumers. Today, although SLAs can be constructed for the network components that deliver the service, it is not possible to monitor the service as it is actually received by the consumer.

Therefore, there exists a need to address the operational shortcomings by monitoring the actual user experience.

SUMMARY OF THE INVENTION

The present invention provides for monitoring quality of service on a receiver unit in a wireless communication system. The method includes configuring one or more monitors on the receiver unit according to a configuration file and using the monitors to collect event data relating to the activities of the receiver unit using the monitors. The method further includes filtering the event data according to the configuration file and transmitting the filtered event data to the control function. The method further includes packaging the filtered event data in a format to be transmitted to a collector unit using the control function unit and transmitting the filtered event data to the collector unit only during the active communication session. The method further includes processing and transmitting the filtered event data to a target unit and generating a result summary of the filtered event data.

In another embodiment, the present invention provides an apparatus for monitoring quality of service on a receiver unit in a wireless communication system. The apparatus includes one or more monitors for gathering event data relating to the activities of a receiver unit, a control function unit coupled to the one or more the monitors for receiving the event data, a collector unit coupled to the control function unit for receiving and processing the event data, and one or more target units coupled to the collector unit for receiving the event data.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF PREFERRED EMBODIMENTS

Provisional Application No. 60/833,414 and its accompanying appendices are hereby incorporated in the present application by reference. In the following description of the preferred embodiments, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
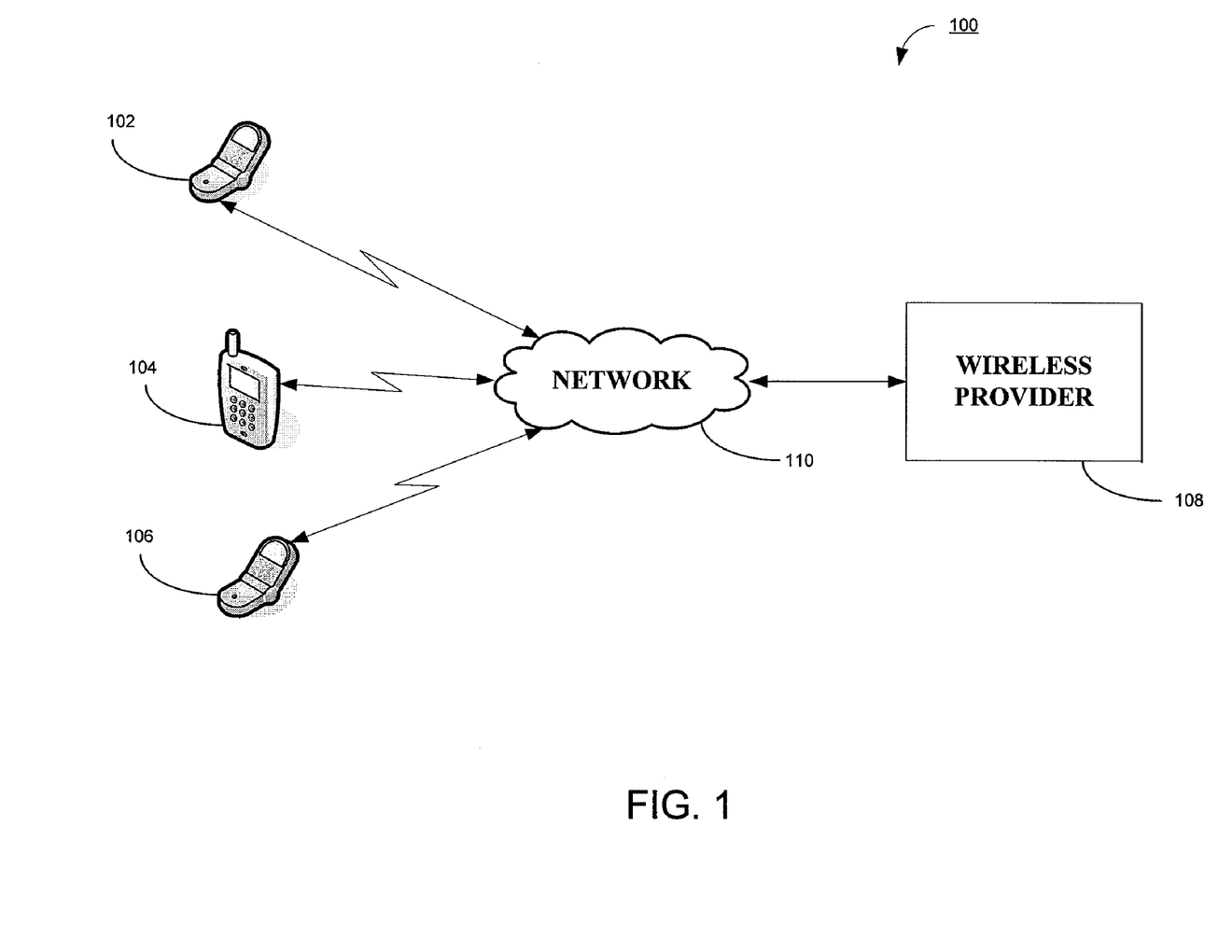
FIG. 1 illustrates a block diagram of a wireless communication system which includes a method for monitoring the quality of service on a receiver unit in the wireless communication system

FIG. 1 illustrates a wireless communication system 100 that includes receiver units 102, 104 and 106 connected to a wireless provider 108 over a network 110. In one embodiment, the receiver units 102, 104 and 106 may be cellular phone devices which are connected over a network to a back end server provided by the wireless provider 108. The receiver units 102, 104 and 106 and the wireless provider 108 incorporate elements which are described in detail below.

Figure 2:
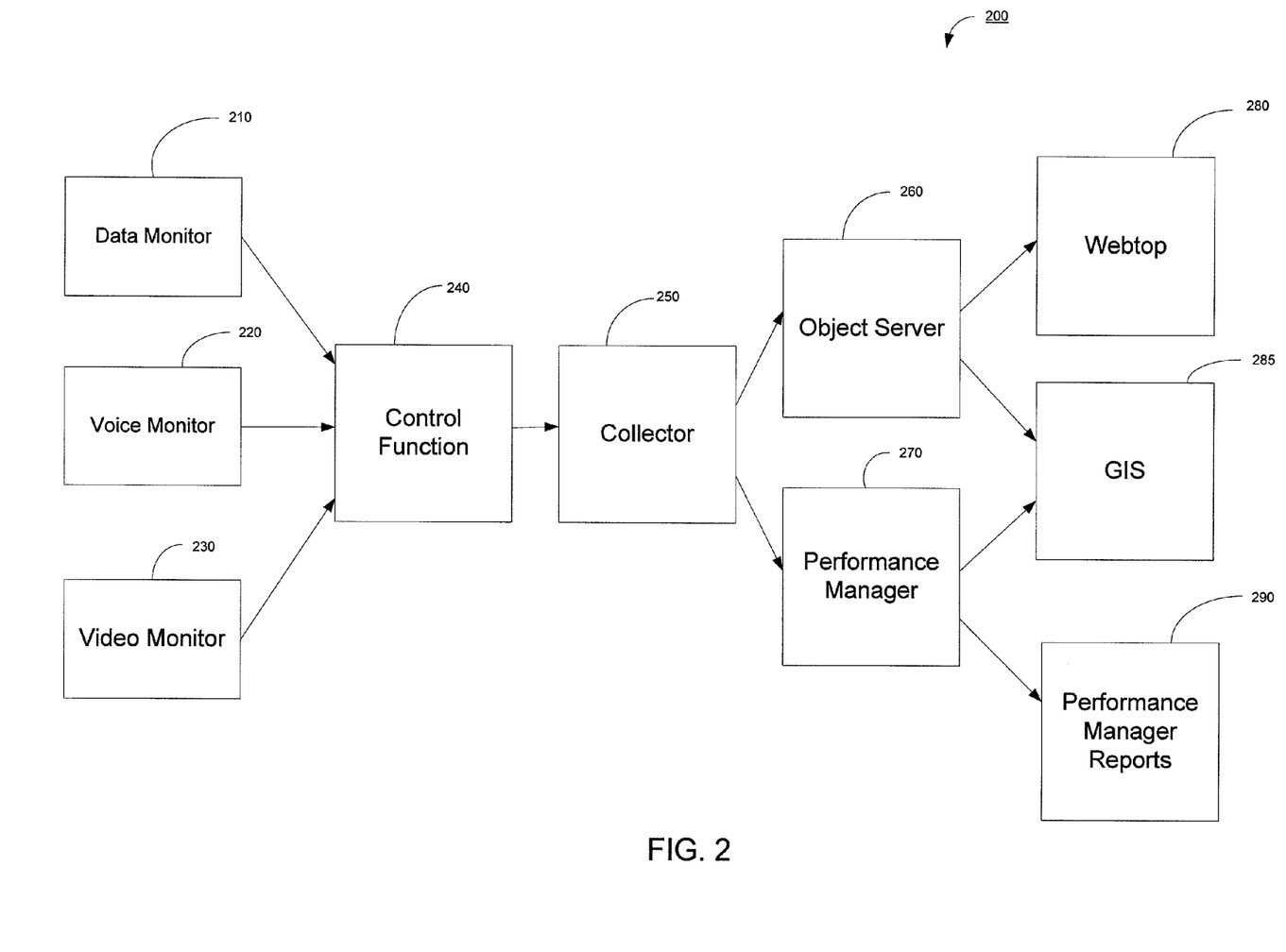
FIG. 2 illustrates a block diagram of a quality management system according to one embodiment of a method for monitoring the quality of service on a receiver unit in a wireless communication system.

FIG. 2 illustrates a system 200 that includes a data monitor 210, a voice monitor 220, a video monitor 230, a control function unit 240, a collector unit 250, an object server 260, a performance manager unit 270, a Webtop 280, a Geographical Information System (GIS) 285, and a Performance Manager Report 290.

The monitors 210, 220 and 230 and the control function unit 240, the collector unit 250 and the performance manager unit 270 of the system 200 may be processing elements which operate in response to a set of executable instructions. In another embodiment, the monitors 210, 220 and 230 and the control function unit 240, the collector unit 250 and the performance manager unit 270 may be an ASIC or any other suitable processing element. The Webtop 280, the GIS 285, and the Performance Manager Report 290 may be an application operating on a processing element in response a set of executable instructions or any other suitable application operating on a processing element.

In one embodiment, the data monitor 210, the voice monitor 220 and the video monitor 230 are installed on a receiver unit, such as one of the receiver units 102, 104 and 106 of FIG. 1. Data is collected by the data monitor 210, the voice monitor 220 and the video monitor 230 in the form of events relating to the activities of the receiver unit. The control function unit 240 is also installed on the receiver unit and serves to initiate and configure monitors 210, 220 and 230 and to subsequently transmit the data collected by each monitor over a network, such as the computer network 110 of FIG. 1, to the collector unit 250, which may be maintained by the wireless provider 108 of FIG. 1. The collector unit 250 receives the data, places it in its queue, and then processes and transmits the data to different targets, such as the object server 260 and the performance manager unit 270, which may then be processed further and results transmitted to an interface such as Webtop 280 or the Performance Manager Report 290, or transmitted to a system for further processing such as GIS 285. In one embodiment, the operation of the apparatus of FIG. 2 is illustrated by the steps of the flowchart in FIG. 3.

Figure 3:
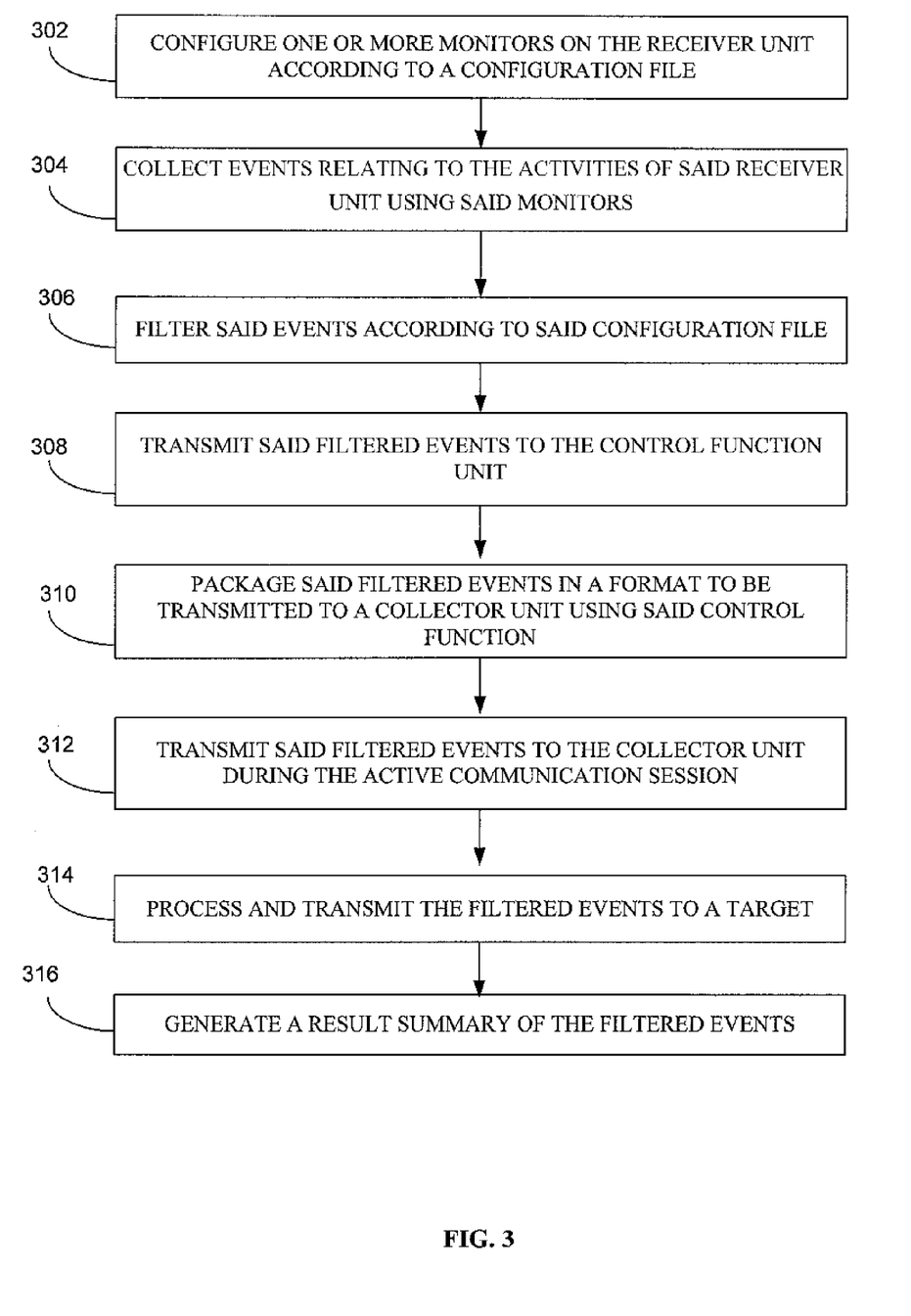
FIG. 3 illustrates a flow chart of the steps of quality monitoring according to one embodiment of a method for monitoring the quality of service on a receiver unit in a wireless communication system.

FIG. 3 illustrates a flowchart of the steps of monitoring quality according to one embodiment of a method for monitoring the quality of service on a receiver unit in a wireless communication system. In one embodiment, the method begins, step 302, by configuring one or more monitors on the receiver unit according to a configuration file. In one embodiment, the event data may include communication startup, duration of communication and quality of the communication such as the signal strength of the receiver unit. As discussed above with respect to FIG. 2, this may be performed by the control function unit 240 of the system 200. In one embodiment, the control function unit 240 may have predetermined parameters defined in an operational queue in order to configure the one or more monitors.

The next step, step 304, includes collecting event data relating to the activities of the receiver unit using the monitors. As discussed above with respect to FIG. 2, this may be performed by the monitors 210, 220 and 230. The next step, step 306, includes packaging the filtered event data in a format to be transmitted to a control function unit using the monitors and then transmitting the filtered event data to the control function unit, step 308. As discussed above with respect to FIG. 2, this may be performed by the monitors 210, 220 and 230. In one embodiment, executable instructions may be defined in the operational queue of the control function 240 which configures monitors 210, 220 and 230 to collect, package and transmit the event data.

The next step, step 310, includes packaging the filtered event data in a format to be transmitted to a collector unit using the control function unit and then transmitting the filtered event data to the collector unit during the active communication session, step 312. As discussed above with respect to FIG. 2, this may be performed by the control function unit 240. In one embodiment, the control function unit 240 may have executable instructions defined in an operational queue in order to configure the one or more monitors.

The next step, step 314, includes processing and transmitting the filtered event data to a target unit. As discussed above with respect to FIG. 2, this may be performed by the collector unit 250, as it transmits the processed event data to the object server 260 or the performance manager unit 270. The next step, step 316, includes generating a result summary of the filtered event data. As discussed above with respect to FIG. 2, this may be performed by the Webtop 280, the Performance Manager Report 290, or the GIS 285. In one embodiment, an application, e.g. the Webtop 280, the Performance Manager Report 290 or the GIS 285 of FIG. 2, may include a set of executable instructions which processes and converts the received event data and generates a summary report.

Figure 4:
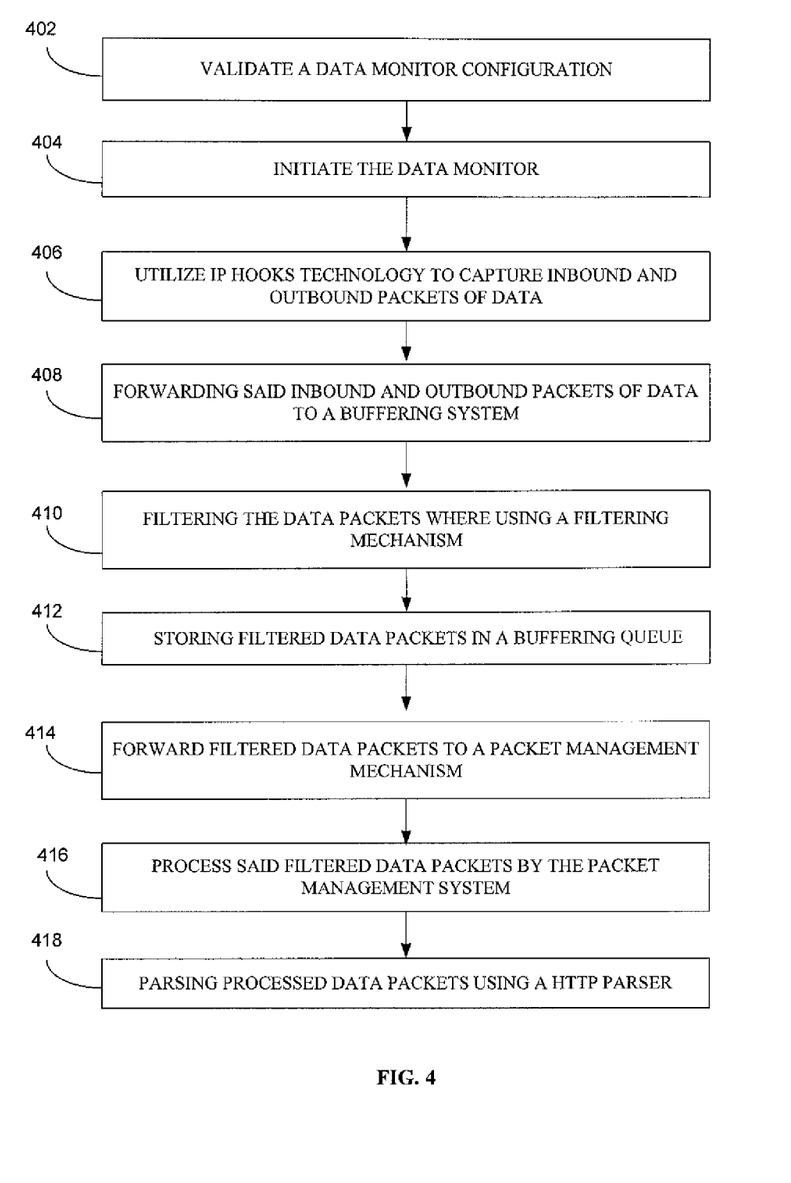
FIG. 4 illustrates a flow chart of the steps of collecting and processing data using a data monitor according to one embodiment of a method for monitoring the quality of service on a receiver unit in a wireless communication system.

FIG. 4 illustrates a flow chart of the steps of collecting and processing data using a data monitor according to one embodiment of a method for monitoring the quality of service on a receiver unit in a wireless communication system. In one embodiment, the method begins, step 402, by validating a data monitor configuration, e.g. in XML. As discussed above with respect to FIG. 2, this may be performed by the control function unit 240. The next step, step 404, includes initiating the data monitor, which is done by the control function unit 240. The next step, step 406, includes utilizing Internet Protocol (IP) hooks technology to capture inbound and outbound packets of data. As discussed above with respect to FIG. 2, this may be performed by the data monitor 210. In one embodiment, inbound packets of data are data directed to the receiving unit and outbound packets of data are data directed from the receiving unit.

The next step, step 408, includes forwarding the inbound and outbound data packets to a buffering system within the data monitor. In one embodiment, this may be accomplished by using an Interprocess Communication (IPC) call. The next step, step 410, includes filtering the data packets using a filtering mechanism based on needs or relevance parameters. The next step, step 412, includes storing the filtered data packets in a buffering queue, which is then forwarded to a packet management mechanism, step 414. In another embodiment, the buffering system detects low memory conditions on a receiver unit and it drops packets once a low memory condition has been identified. In another embodiment, the buffering system may enhance performance by removing excessive data packets before storing in its buffering queue if the buffering system is configured so as to define limitations as to the types and/or sizes of data packets.

The next step, step 416, includes processing the filtered data packets by the packet management mechanism, which deserializer the data packets in order to produce and maintain data packet streams in manageable sessions. The next step, step 418, includes parsing the processed data packets using a HTTP parser in order to determine the end of a data packet stream.

The collection and processing of data using a video monitor according to one embodiment of a method for monitoring the quality of service on a receiver unit in a wireless communication system uses a nearly identical process as used with the data monitor outlined in FIG. 4 and described above. In one embodiment, the event data monitored by the video monitor 230 of FIG. 2 may include start time of a video communication, the duration of a video communication, the quality of a video communication or the signal strength of the receiver unit.

Figure 5:
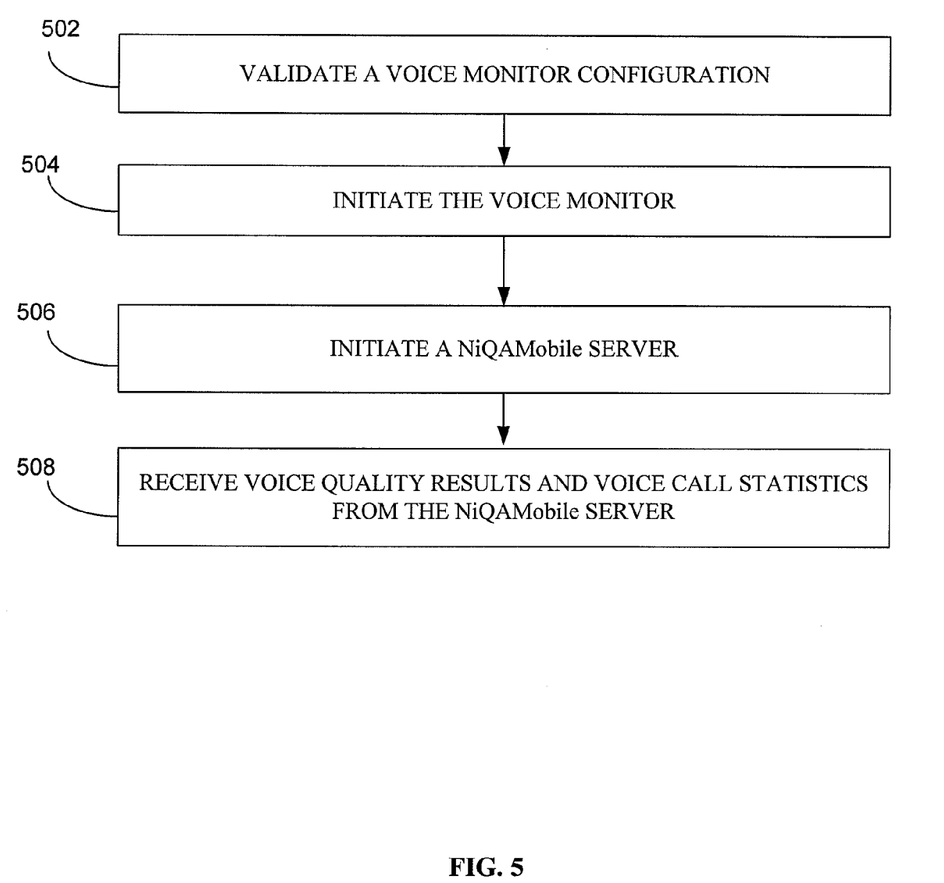
FIG. 5 illustrates a flow chart of the steps of collecting and processing data using a voice monitor according to one embodiment of a method for monitoring the quality of service on a receiver unit in a wireless communication system.

FIG. 5 illustrates a flow chart of the steps of collecting and processing data using a voice monitor according to one embodiment of a method for monitoring the quality of service on a receiver unit. The design of the voice monitor component aims to provide real-time assessment of voice call quality using the Psytechnics NiQA Mobile quality assessment algorithm. In one embodiment, the method begins, step 502, by validating a voice monitor configuration, e.g. in XML. As discussed above with respect to FIG. 2, this may be performed by the control function unit 240. The next step, step 504, includes initiating the voice monitor, which is done by the control function unit 240. Once the voice monitor starts, it initiates a NiQAMobile server, step 506, which is accomplished by the voice monitor 220 of FIG. 1. The NiQAMobile server detects new calls, records voice conversations and analyses the voice streams in real-time. The next step, step 508 includes receiving voice quality results and voice call statistics from the NiQAMobile server.

In one embodiment, the voice monitor may operate in short mode, wherein the voice monitor only monitors a phone call for the first 30 seconds and provides the results to a control function unit after that interval. In another embodiment, the voice monitor may operate in full mode, wherein a voice conversation is monitored for the entire duration of a call and the results are transmitted to a control function unit at the end of the call. In another embodiment, the voice monitor may operate in continuous mode where a voice conversation is monitored for its entire duration, but a rolling analysis of call quality is provided by transmitting results to a control function unit periodically during the call.

In one embodiment of the invention, as discussed above in FIG. 2, the control function unit 240 of the system 200 is installed on the receiver unit and serves to initiate and configure monitors 210, 220 and 230 and to subsequently transmit the data collected by each monitor over a network to the collector unit 250. The control function also filters the data and stores them in a queue in order for it to be transmitted to the collector unit 250. In order to transmit the data, the data is packaged suitably for the transport over which they are to be sent, such as UDP Reports which are compressed and encrypted before transmission to the collector unit such that a third party will not be able to "comprehend" the data even if it can intercept the data. The control function unit is also able to use different Internet settings based on the country in which it is being used to account for roaming.

The control function unit 240 utilizes an internal Event-Producer, EventReporter and InternetConnectionResource-Manager. The EventProducer will not start any monitors until it finds an "accept" statement whose Mobile Network Code (MNC) and Mobile Country Code (MCC) match the one the receiving unit is currently connected to. If the receiving cannot return a valid MCC or MNC at startup because of temporary unavailability of a signal, the EventProducer will delay and re-check repeatedly at "checkintervalseconds" intervals and no monitors will start until an MCC and MNC may be read. After they have been read, if no "accept" is found with a matching MCC and MNC then the producer's configuration method will return a fail. Monitors, such as the data monitor 210, the voice monitor 220 and the video monitor 230 of FIG. 2, are loaded at start up and are unloaded and reloaded when the configuration changes.

The control function unit 240 will then create a queue and a filter and then start the monitors. The data that is delivered from one or more receiver units after the monitors have initiated and are then filtered and stored. The EventReporter is then able to package up the data into a UDPReport. The EventReporter begins to "pull" event data from the EventProducer and "add" them into the UDPReport until either no further data is available or the UDPReport is "full." In the event of a "full" state, any data that could not "fit" is "pushed" back to the EventProducer.

The control function unit 240 also utilizes an internal Internet Connection Resource Manager (ICRM), which is a connection caching mechanism to reduce the number of network connections made. The ICRM maintains a connection for a configurable time limit after it has been opened and then closes it for some configurable multiple of the actual connection time. Should the connection not be possible due to some error condition, an exponential backoff strategy is used to re-attempt a connection less and less frequently up to some maximum period in order to protect battery life in conditions where a connection is impossible. If a connection is held open for longer than the "connect time" the ICRM does not stop it until control over that connection is returned by the component that requested it in order to prevent potential crashes. It is, however, able to record the time usage of the connection and it will delay all other attempts to use the connection by a "blackoutfactor" multiplied by the actual duration of the connection. The ICRM serves to expedite event data delivery by connecting immediately, to save the battery by slowing the rate of connection attempts after repeated failures, and to reduce the need for connect-disconnect cycles, which translates into a load on the network and the mobile phone's battery, by making efficient use of a connection when it is created. This is of particular importance in the case where data arrives into the control function unit at short intervals, e.g. the voice monitor's 220 short mode or when the data monitor 210 measures access to a web page with several monitored components.

The control function unit 240 also utilizes portable libraries to ensure that event data which is created by any monitor may be handled by the control function 240 and the collector 250. Any software using the libraries is able to create and modify event data and prepare them in an encrypted, compressed, serial binary format which is suitable for transmission.

In one embodiment, as discussed in FIG. 2 above, the collector unit 250 receives the data, places it in its queue, and then processes and transmits the data to different targets, such as the object server 260 and the performance manager unit 270, which may then be processed further and results transmitted to an interface such as Webtop 280 or the Performance Manager Report 290, or transmitted to a system for further processing such as GIS 285. The collector unit 250 can supports multiple receivers and multiple senders. The collector unit 250 receives the data from the control function unit 240 and decodes and decrypts the message for transmission to the different targets.

In one embodiment, the collector unit 250 may transmit the data to a performance manager unit, e.g. performance manager unit 270 of FIG. 2, where the data may be processed in order to generate a result summary of the performance quality of an individual receiver unit or multiple receiver units, such as reception quality, instances of disconnections, e.g. dropped calls, etc. In another embodiment, the collector unit 250 may transmit the data to a server, e.g. object server 260 of FIG. 2, in order to be used by a separate system algorithim, e.g GIS 285, or by an on-line processing interface, e.g. Webtop 280.

Therefore, the present invention provides for a method and apparatus to monitor the quality of service on a receiver unit in a wireless communication system which provides the benefits of expediting event data delivery by connecting immediately, saving battery life by slowing the rate of connection attempts after repeated failures, reducing the need for connect-disconnect cycles (thus load on the network and the mobile phone's battery) by making efficient use of a connection when it is created, and providing a rate at which connections are made.

The foregoing description of the specific embodiments so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for monitoring quality of service on a receiver unit in a wireless communication system, the method comprising:
    configuring one or more monitors on said receiver unit according to a configuration file, the one or more monitors including at least one of a voice monitor operating in a short mode, a voice monitor operating in a full mode, and a voice monitor operating in a continuous mode;
    collecting event data relating to activities of said receiver unit using said monitors during one or more active communication sessions;
    filtering said event data according to said configuration file, wherein filtering said event data includes removing excessive data based on a type or a size of said event data;
    transmitting said filtered event data to a control function unit from said monitors, the control function unit controlling the one or more monitors and the transmission of the filtered event data to the control function unit;
    managing connections of the one or more active communication sessions using the control function unit, the control function unit including a connection resource manager, management of the connections including managing period and duration of the one or more active communication sessions;
    packaging said filtered event data in a format to be transmitted to a collector unit using said control function unit;
    transmitting said filtered event data to the collector unit only during the one or more active communication sessions associated with the activities of the receiver unit in the filtered event data, the filtered event data transmitted to the collector unit within the managed period and duration of the one or more active communication sessions;
    processing and transmitting the filtered event data to a target unit; and
    generating a result summary of the filtered event data.

2. The method of claim 1 wherein the step of configuring the one or more monitors on said receiver unit according to a configuration file during an active communication session, includes:
    validating the configuration of the one or more monitors on said receiver unit during an active communication session.

3. The method of claim 2 wherein the step of configuring the one or more monitors on said receiver unit according to a configuration file during an active communication session, includes:
    returning a configuration status to the control function unit.

4. The method of claim 1 wherein the step of filtering said event data according to said configuration file includes:
    queuing the filtered event data in order to be transmitted to the collector unit.

5. The method of claim 1 wherein the one or more monitors include at least one of a data monitor, a voice monitor, and a video monitor.

6. The method of claim 5 wherein the step of collecting event data relating to the activities of said receiver unit using said monitors where the one or more monitors is a data monitor, includes:
    capturing inbound and outbound data packets using Internet Protocol (IP) hooks technology; and
    forwarding said inbound and outbound data packets to a buffering system.

7. The method of claim 6 wherein the step of filtering said event data according to said configuration file where the one or more monitors is a data monitor includes:
    receiving said inbound and outbound data packets at said buffering system;
    forwarding said inbound and outbound data packets to a filtering mechanism;
    filtering said inbound and outbound data packets at the filtering mechanism;
    storing said filtered inbound and outbound data packets in a buffering queue; and
    forwarding said filtered inbound and outbound data packets to a packet management mechanism.

8. The method of claim 7 wherein the step of packaging said filtered event data in a format to be transmitted to said collector unit where the one or more monitors is a data monitor, includes:
    receiving said filtered inbound and outbound data packets at the packet management mechanism;
    processing said filtered inbound and outbound data packets by the packet management mechanism;
    forwarding the processed inbound and outbound data packets to a HTTP parser; and
    parsing said processed inbound and outbound data packets by the HTTP parser.

9. The method of claim 5 wherein the step of collecting event data relating to the activities of said receiver unit using said monitors where the one or more monitors is a voice monitor, includes:
    initiating a NiQAMobile server; and
    receiving voice quality results and voice call statistics from said NiQAMobile server.

10. An apparatus for monitoring quality of service on a receiver unit in a wireless communication system, the apparatus comprising:
    one or more monitors for gathering event data relating to activities of a receiver unit during one or more active communication sessions, wherein gathering the event data includes removing excessive data based on a type or a size of the event data, the one or more monitors including at least one of a voice monitor operating in a short mode, a voice monitor operating in a full mode, and a voice monitor operating in a continuous mode;

a control function unit coupled to the one or more said monitors for receiving said event data, controlling the one or more monitors and controlling transmission of the event data received from the one or more monitors;

a connection resource manager coupled to the control function unit for managing connections of the one or more active communication sessions, management of the connections including managing period and duration of the one or more active communication sessions;

a collector unit coupled to said control function unit for receiving the event data only during the one or more active communication sessions associated with the activities of the receiver unit in the event data and processing said event data, the event data received by the collector unit within the managed period and duration of the one or more active communication sessions; and one or more target units coupled to said collector unit for receiving said event data.

11. The apparatus of claim 10, wherein the one or more monitors include at least one of a data monitor, a voice monitor, and a video monitor.

12. The apparatus of claim 11, wherein the one or more monitors is a data monitor, the data monitor includes: a data monitor plugin; a HTTP packet parser; a packet management system; a buffering system; and an Internet Protocol (IP) Hooks technology unit.

13. The apparatus of claim 10, wherein the one or more monitors is a voice monitor, the voice monitor includes: a voice monitor coupled to a NiQAMobile server.

14. The apparatus of claim 10, wherein the one or more monitors is a video monitor, the video monitor includes:
a video monitor plugin;
a HTTP packet parser;
a packet management system;
a buffering system; and
an Internet Protocol (IP) hooks technology unit.

15. The apparatus of claim 10, wherein the one or more target units coupled to said collector unit for receiving said event data includes an object server.

16. The apparatus of claim 10, wherein the one or more target units coupled to said collector unit for receiving said event data includes a performance manager unit.

* * * * *